United States Patent [19]
von Starck et al.

[11] 4,092,086
[45] May 30, 1978

[54] ELECTROMAGNETIC CONVEYER TROUGH FOR THE CONVEYANCE OF MOLTEN METALS

[75] Inventors: Axel von Starck, Remscheid; Hans-Erwin Gerbig, Huckeswagen-Wiehagen, both of Germany

[73] Assignee: AEG-Elotherm, G.m.b.H., Remscheid-Hasten, Germany

[21] Appl. No.: 778,582

[22] Filed: Mar. 17, 1977

[30] Foreign Application Priority Data

May 14, 1976 Germany .............................. 2621636

[51] Int. Cl.² ........................ H02K 45/00; H02N 4/20
[52] U.S. Cl. ..................... 417/50; 198/619; 310/11
[58] Field of Search ..................... 198/619; 310/12, 13, 310/54, 11; 417/50; 222/592, 594

[56] References Cited
U.S. PATENT DOCUMENTS

| 1,830,457 | 11/1931 | Apple | 310/54 |
|---|---|---|---|
| 2,727,161 | 12/1955 | Kilner et al. | 310/54 X |
| 3,447,002 | 5/1969 | Rönnevig | 310/54 |
| 3,614,493 | 10/1971 | Collings et al. | 310/54 |
| 3,645,646 | 2/1972 | von Starck | 417/50 |
| 3,684,402 | 8/1972 | von Starck | 417/50 |
| 3,738,777 | 6/1973 | von Starck et al. | 417/50 |
| 3,913,045 | 10/1975 | von Starck | 310/13 X |
| 3,963,950 | 6/1976 | Watanabe et al. | 310/54 |

Primary Examiner—Evon C. Blunk
Assistant Examiner—James L. Rowland
Attorney, Agent, or Firm—Cushman, Darby & Cushman

[57] ABSTRACT

An electromagnetic conveying trough for conveying molten metals with a trough body extending in the direction of conveyance and lined with a fireproof lining and an inductor for producing a travelling electromagnetic field and formed as a grooved laminated package, the transversely extending grooves defining teeth about which individual coil windings are wrapped. In order to replace the inductor below a molten metal breakthrough without removing all of the lining, the coolant pipes are formed coaxial with each winding as a unit with separate coolant connections to each such unit.

6 Claims, 2 Drawing Figures

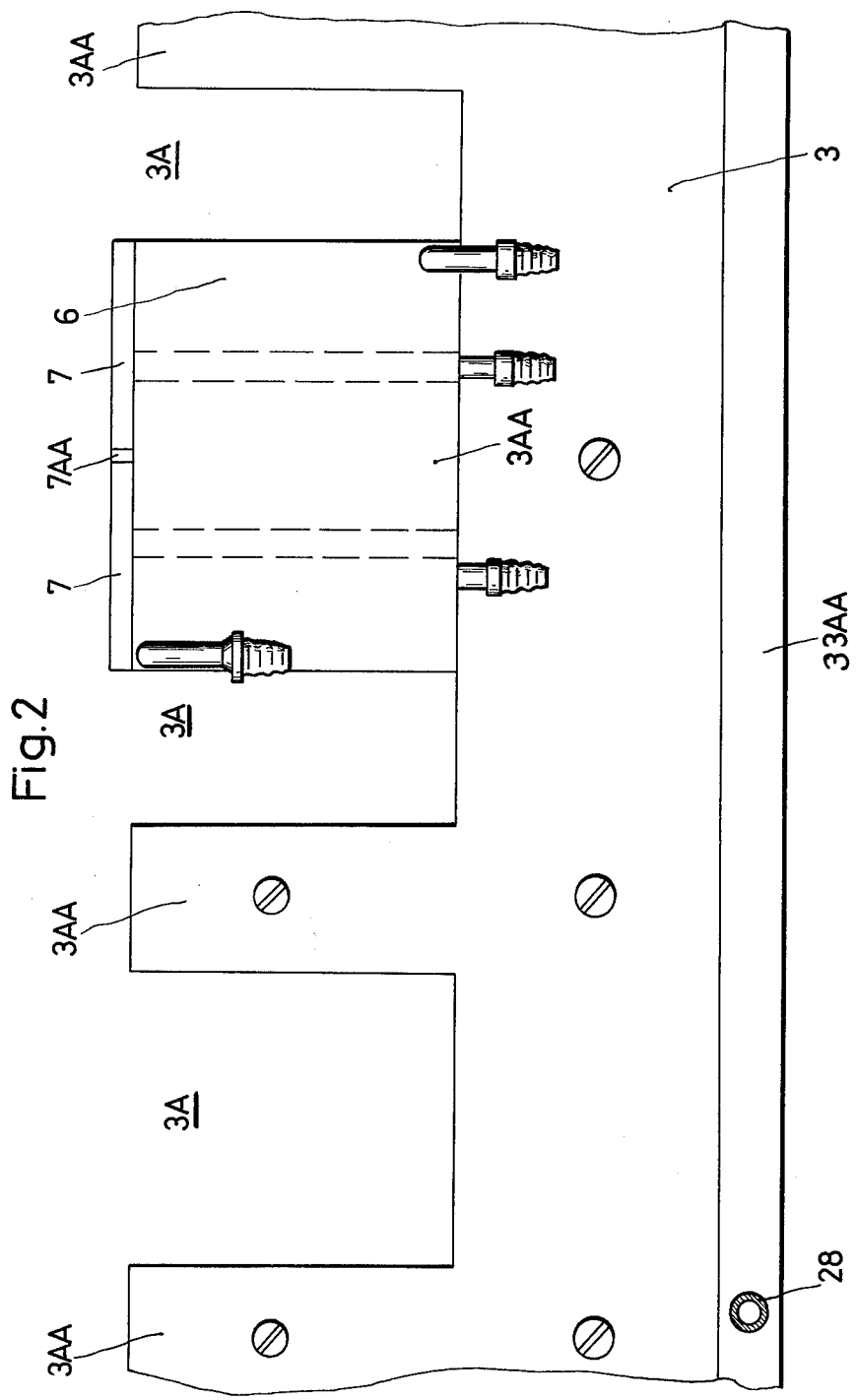

ELECTROMAGNETIC CONVEYER TROUGH FOR THE CONVEYANCE OF MOLTEN METALS

The invention relates to an electromagnetic conveying trough for the conveyance of molten metals having a trough body extending in the direction of conveyance with a conveying channel conducting the metal in a fire-resistant lining and with an inductor, extending in the trough body along the direction of the conveying channel, for the production of an electromagnetic travelling field progressing in the conveying channel in the direction of conveyance. The inductor consists of a plane, riveted laminated package, the grooves of which facing the conveying channel run transversely to the direction of conveyance and the teeth of which are encompassed by individual coils containing a solid wire winding and which can be attached to an electric power line. Pipe lines are disposed in the grooves of the laminated package which may be supplied with a fluid coolant for cooling the individual coils and the laminated package.

The operational readiness of such conveying troughs which serve, for example, for the conveyance of liquid cast iron, is determined, among other things, by the useful life of the fire-resistant lining of the conveying channel. Breakthroughs of the molten material through the lining as a result of erosion will generally destroy the inductor disposed below the break in the lining which must then be replaced. At this time, the cooling water pipes normally disposed in the grooves of the inductor laminated package are a problem, which pipes extend in grooves of the package with a meander-shape course along the length of the package.

To repair the lining of the trough, it is necessary to remove this lining even in its non-destroyed areas in order to be able to remove the cooling water lines disposed in the grooves.

To improve the known construction of troughs it, therefore, is proposed corresponding to the present invention to dispose the pipe lines coaxially in relation to the individual coils, so that the lines are constructionally united with the individual coils and provided with connections for the feeding in, or discharge of, the coolant. Thus, each individual coil (together with their pertinent coolant lines) constitute a separate construction unit which is connected with the remaining parts of the trough or of the inductor merely by way of detachable liquid couplings, so that any kind of repair that is to be accomplished in the area of an individual inductor pole may be accomplished without destruction of adjoining areas.

At the same time, the overall cooling of the coil arrangement is improved because of the concentric arrangement of the cooling pipes. Because of the independence of the constructional units of one another, it is possible to construct conveying troughs of any arbitrary length from construction units which are homogenous one with the other.

It is also possible to make the pipe lines of metallic raw material, such that the pipe lines encircle the pertinent tooth of the laminated package in the manner of a cylindrical winding. The pipe lines can have an electric insulation at their outside surface and can be connected by way of their terminals to pipe lines made of electrically insulating material with a supply and discharge lines for the fluid coolant. In this arrangement, the pipe lines constitute an open secondary winding for the individual coils.

Furthermore, the pipe line and the winding wires of each individual coil are attached on a holding metal sheet made of non-magnetic material, constituting a front side of the individual coil and, together with this holding sheet disposed electrically insulated against the laminated package of the inductor and the housing, are mounted in the grooves.

Slots are provided in the holding sheet for reduction of losses through eddy currents and to prevent an electric short circuit of the cylinder winding of the pipe lines to ensure that the electric losses of the trough are kept small.

The attached drawings explain a preferred embodiment of the invention by way of example.

FIG. 2 shows a side cross-sectional view in the direction II—II of FIG. 1 of the laminated package of the inductor shown there, omitting a part of the inductor windings for clarity.

Figure 1:
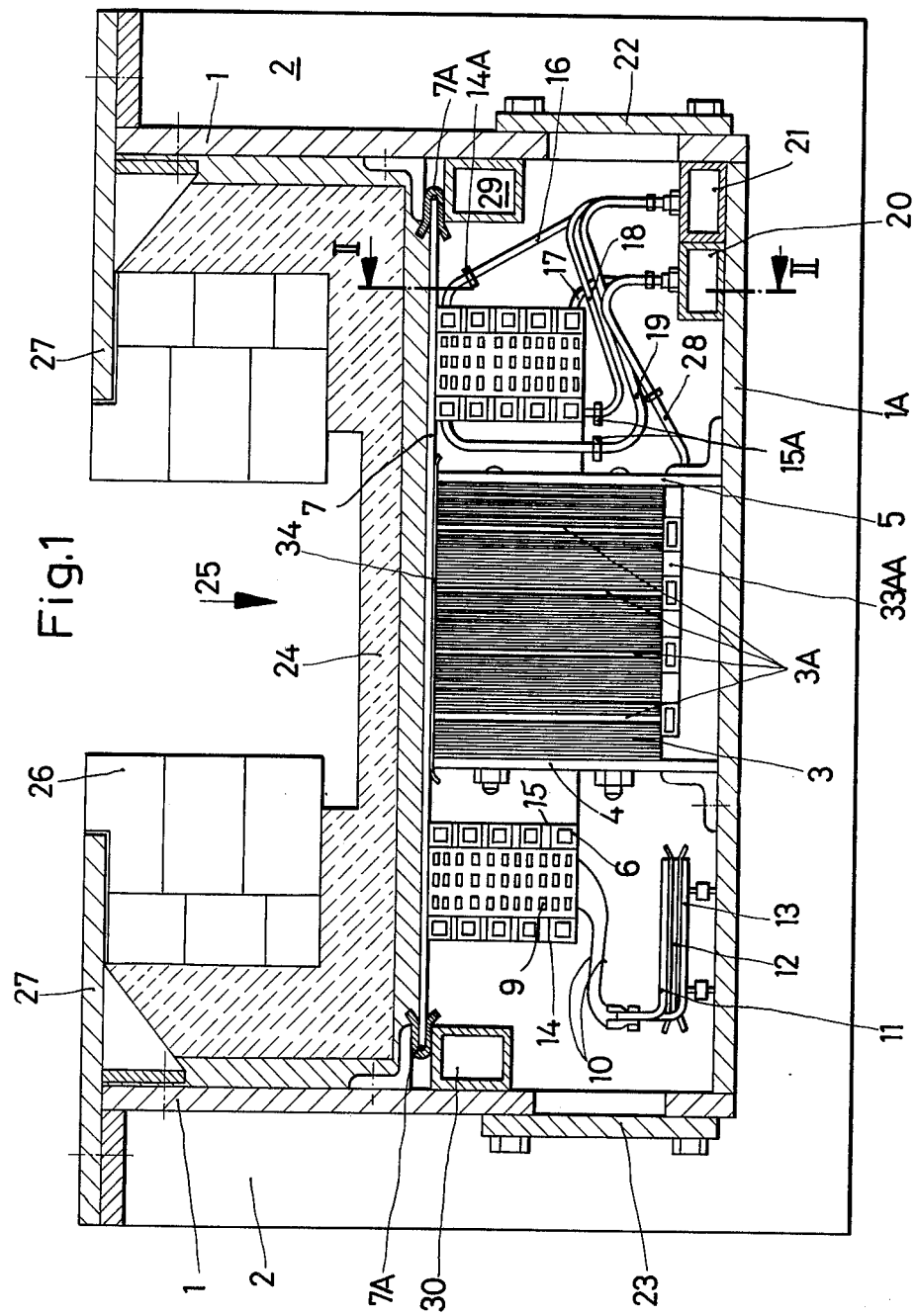
FIG. 1 shows a cross-sectional view perpendicular to the direction of conveyance of an electromagnetic conveying trough corresponding to the present invention.

In FIG. 1, number 1 designates a sheet metal construction of U-shaped profile which extends in the direction of conveyance of the metal that is to be conveyed (perpendicularly to the direction of presentation of FIG. 1) as the housing of the conveying trough. The sheet metal housing 1 is reinforced at separated locations along the direction of conveyance of reinforcements 2 extending perpendicularly to the plane of the metal sheet. Reinforcements 2 consist of strips of sheet metal.

The base sheet 1A of the profile 1 mounts a laminated sheet metal package 3. The planes of the sheet metal package 3 extend in the direction of conveyance of the liquid metal. Sheet metal package 3 is clamped down between sheets 4 and 5 via screw connections and is attached on the bottom of the bottom metal sheet 1A. The laminated package 3 (CF. FIG. 2) has grooves 3A extending through the body of the package transverse to the direction of conveyance, which grooves are bound by teeth 3AA. Cylindrical coils 6 are wound onto the individual teeth and connected with an electric 3-phase supply network. One coil 6 is illustrated in section in FIG. 1 and in top view in FIG. 2.

The coil bodies include a holding sheet 7 of non-magnetic steel which is attached by way of electrically insulating intermediate layers 7A to housing 1, and of a coil body 6, attached to the sheet metal, consisting of a cylindrical winding 9 of insulated solid wire which may be connected via supply lines 10 to two rails 11 and 12 of a 3-phase supply network, to which also belongs the contact rail 13, and of two cooling water lines 14 and 15 of copper pipe, which are disposed coaxially to the cylindrical winding 9. The cooling water line 14 is disposed on the outside wall of the cylinder winding while the cooling water line 15 is disposed on the inside of the cylindrical winding. Coil body 6 comprised of cylindrical winding 9 and water lines 14 and 15 are preferably cast in plastic into a unit.

Both cooling water lines are provided with inflow or discharge connections 14A and 15A so that pipe lines 14 and 15 may be connected with pipe lines 16, 17, 18 and 19 consisting of an electrically insulating material by way of pertinent connections. These pipe lines are connected with the cooling water supply line 20 and a cooling water discharge line 21, both of which are connected in a heat conducting manner with bottom plate 1A. The coil body consisting of the cylinder winding 9 and the pipe lines 14 and 15 in connection with the plastic filling material are self-supporting and connected with holding plate 7, e.g., by way of pipe lines 14 and 15 by means of corresponding connections, e.g., a screw or welded connection. The pipelines 14 and 15 are disposed so that they are insulated in the case coil body against each other via their outside surfaces in an electrically insulated manner and that they contain no annular connection closed within itself and electrically conductive.

On the basis of this development, an induced electric current cannot flow via the pipe lines 14 and 15. A corresponding current flows with relatively low current only by way of the closed cooling water circuit.

The lateral sheet metals of the housing profile 1 have recesses which are closed by way of lid metal sheets 22 and 23. The hollow supply lines 10 or the connecting pieces 14A and 15A may be connected with the 3-phase supply network or the cooling water connecting lines via the pertinent recesses.

The holding sheets 7, moreover, have a slot 7AA (FIG. 2) completely cutting the plane of the sheet metal in order to reduce losses of eddy current, which slit divides the sheet metal into two halves and thus prevents the flow of current between these halves. An intermediate layer 34 made of electrically non-conductive material insulates holding sheet 7 electrically against laminated package 3.

Above the holding sheets in a corresponding lining made of fire-resistant material 24 is disposed a conveying channel 25. The electromagnetic inductor consisting of the coil bodies 6 and the laminated package 3 produces an electromagnetic moving field progressing in the direction of conveyance in the conveying channel 25, which moving field conveys the molten cast iron located in the conveying channel 25 in the direction of the progressing moving field. Housing profile 1 is partly covered up from above with a brick lining 26 and cover sheets 27.

For the discharge of heat from the laminated package 3, the latter has additionally been provided with copper plates 3A, which are located in the laminated package in parallel to the planes of the sheets and are connected with a cooling plate 33AA (FIG. 2). Cooling plate 33AA consists of copper pipe lines which run in the longitudinal direction of the laminated package 3 and which cover the back of the laminated package. The pipe lines of the copper cover of the back are connected via pertinent pipe lines 28 with the cooling water lines 20 and 21.

Otherwise, the arrangement for cooling the housing construction 1 is additionally made in such a way that the perpendicularly running sheets of the leg of the U-shaped profile 1 are brought into contact with additional metallic cooling water lines 29 and 30.

Many changes and modifications in the above described embodiment of the invention can be carried out without departing from the scope of the invention. Accordingly, that scope is intended to be limited only by the scope of the appended claims.

What is claimed:

1. In an electromagnetic conveying trough for conveying molten metals with a trough body extending in the direction of conveyance and lined with a fire-resistant lining, an inductor extending in the trough body along the direction of conveyance for producing a travelling electromagnetic field, said inductor including a grooved, laminated package with the grooves running transverse to the direction of conveyance and defining teeth, a coil winding disposed about each of said teeth and adapted for connection to a source of electrical potential, and coolant pipe lines extending in said grooves, the improvement wherein said pipe lines extend coaxially with respect to each said winding so as to form a separate and distinct unit with said winding, and wherein said electromagnetic conveying trough comprises coolant supply and discharge means for individually supplying coolant to said pipe lines in each of said separate and distinct units so that each of said units operates and may be replaced independently of the other of said units.

2. In a trough as in claim 1 wherein said pipe lines are formed as cylinders and are provided with electrical insulation on their outside surfaces and wherein said connecting means are formed of electrically insulating material.

3. In a trough as in claim 2 wherein said pipe lines and windings in each unit are attached to a non-magnetic holding sheet and electrically insulated from said laminated package.

4. In a trough as in claim 3 wherein said sheet has an electrically non-conductive slot extending into the plane of said sheet.

5. In a trough as in claim 3 further including a steel housing having a U-shaped profile, a bottom sheet for mounting said package and lateral walls for electrically insulated mounting of said holding sheet.

6. In a trough as in claim 1 wherein said pipe lines and windings are cast in plastic into a unit.

* * * * *